(12) United States Patent
Hayashi et al.

(10) Patent No.: US 11,223,068 B2
(45) Date of Patent: Jan. 11, 2022

(54) MANUFACTURING METHOD OF COMPACTED STRIP-SHAPED ELECTRODE PLATE, COMPACTED STRIP-SHAPED ELECTRODE PLATE, AND BATTERY

(71) Applicants: TOYOTA JIDOSHA KABUSHIKI KAISHA, Toyota (JP); PRIMEARTH EV ENERGY CO., LTD., Shizuoka (JP)

(72) Inventors: Kunihiko Hayashi, Anjo (JP); Shun Okuda, Kosai (JP)

(73) Assignees: TOYOTA JIDOSHA KABUSHIKI KAISHA, Toyota (JP); PRIMEARTH EV ENERGY CO., LTD., Kosai (JP)

( * ) Notice: Subject to any disclaimer, the term of this patent is extended or adjusted under 35 U.S.C. 154(b) by 174 days.

(21) Appl. No.: 16/590,658

(22) Filed: Oct. 2, 2019

(65) Prior Publication Data

US 2020/0161711 A1 May 21, 2020

(30) Foreign Application Priority Data

Nov. 16, 2018 (JP) .............................. JP2018-215447

(51) Int. Cl.
*H01M 10/0587* (2010.01)
*H01M 10/0583* (2010.01)
(Continued)

(52) U.S. Cl.
CPC ..... *H01M 10/0587* (2013.01); *H01M 4/0435* (2013.01); *H01M 4/625* (2013.01);
(Continued)

(58) Field of Classification Search
CPC ......... H01M 10/0587; H01M 10/0583; H01M 10/0525; H01M 4/0435; H01M 4/70;
(Continued)

(56) References Cited

U.S. PATENT DOCUMENTS

2014/0127572 A1* 5/2014 Ozaki ............... H01M 10/0525
429/211
2015/0004488 A1* 1/2015 Abdelsalam .......... H01M 4/587
429/218.1

(Continued)

FOREIGN PATENT DOCUMENTS

| JP | 2000-133250 A | 5/2000 |
| JP | 2007-311280 A | 11/2007 |
| JP | 2018-041625 A | 3/2018 |

*Primary Examiner* — Maria Laios
*Assistant Examiner* — Adam J Francis
(74) *Attorney, Agent, or Firm* — Oliff PLC

(57) ABSTRACT

Provided is a manufacturing method of a compacted strip-shaped electrode plate including: an undried layer forming step of forming, on a current collector foil, a strip-shaped undried active material layer by rolling out a particle aggregate; a drying step of drying the undried active material layer to form an active material layer; and a pressing step of pressing the active material layer by rollers to compact the active material layer. The particle aggregate is a mixed particle aggregate in which first wet particles manufactured with the content ratio of conductive particles to the total solid content set to W1 and second wet particles manufactured with the content ratio of conductive particles to the total solid content set to W2, W2 being higher than W1, are mixed together.

9 Claims, 8 Drawing Sheets

(51) Int. Cl.
  *H01M 4/04*      (2006.01)
  *H01M 4/70*      (2006.01)
  *H01M 4/62*      (2006.01)
  *H01M 50/538*    (2021.01)
(52) U.S. Cl.
  CPC ......... *H01M 4/70* (2013.01); *H01M 10/0583* (2013.01); *H01M 50/538* (2021.01)
(58) Field of Classification Search
  CPC ...... H01M 4/0409; H01M 4/043; H01M 4/13; H01M 4/625; H01M 4/0404; H01M 4/139; H01M 50/538; H01M 4/62
  See application file for complete search history.

(56) References Cited

U.S. PATENT DOCUMENTS

| | | | |
|---|---|---|---|
| 2016/0156016 A1* | 6/2016 | Umeyama | H01M 4/139 29/623.1 |
| 2016/0197339 A1* | 7/2016 | Tanjo | H01M 4/62 429/217 |
| 2018/0047982 A1* | 2/2018 | Huang | H01M 4/382 |

* cited by examiner

MANUFACTURING METHOD OF COMPACTED STRIP-SHAPED ELECTRODE PLATE, COMPACTED STRIP-SHAPED ELECTRODE PLATE, AND BATTERY

INCORPORATION BY REFERENCE

The disclosure of Japanese Patent Application No. 2018-215447 filed on Nov. 16, 2018 including the specification, drawings and abstract is incorporated herein by reference in its entirety.

BACKGROUND

1. Technical Field

The present disclosure relates to a manufacturing method of a compacted strip-shaped electrode plate including a strip-shaped current collector foil and an active material layer formed on the current collector foil in a shape of a strip extending in a longitudinal direction of the current collector foil, and further relates to a compacted strip-shaped electrode plate and a battery employing the compacted strip-shaped electrode plate.

2. Description of Related Art

A strip-shaped electrode plate having an active material layer formed on a strip-shaped current collector foil is known as a type of electrode plate used for a lithium-ion secondary battery etc. Among such strip-shaped electrode plates, some have at least one end portion of the current collector foil in a width direction formed as a strip-shaped exposed section (current collecting section) in which the current collector foil is exposed without the active material layer being provided. For example, Japanese Patent Application Publication No. 2018-041625 (JP 2018-041625 A) discloses a strip-shaped electrode plate of this form (see FIG. 1 etc. of JP 2018-041625 A). This strip-shaped electrode plate is manufactured, for example, by the following method: First, an undried active material layer is formed in a strip shape on a strip-shaped current collector foil, and then this undried active material layer is dried to form an active material layer. Thereafter, the active material layer and the current collector foil are pressed by rollers while being conveyed in the longitudinal direction, so as to press and compact the active material layer in the thickness direction. Thus, a compacted strip-shaped electrode plate is completed.

SUMMARY

However, pressing the active material layer and the current collector foil by rollers while conveying these in the longitudinal direction sometimes resulted in the current collector foil of the strip-shaped electrode plate wrinkling near the boundary between the active material section in which the active material layer is formed and the exposed section in which the current collector foil is exposed. A possible cause of this phenomenon is as follows: In the above-described strip-shaped electrode plate, the active material section in which the active material layer is provided in the thickness direction and the exposed section in which the active material layer is not provided in the thickness direction are different in thickness from each other for the thickness of the active material layer. When the active material layer and the current collector foil are pressed by rollers, a large pressure is applied to the thick active material section, so that in the active material section, the active material layer and the current collector foil are compressed and the current collector foil is stretched in both the longitudinal direction and the width direction. On the other hand, little pressure is applied to the thin exposed section, so that the current collector foil in the exposed section is hardly stretched in either the longitudinal direction or the width direction. Thus, the current collector foil in the active material section is stretched in the longitudinal direction, whereas the current collector foil in the exposed section is hardly stretched in the longitudinal direction. This difference seems to appear as wrinkles in the current collector foil near the boundary between the active material section and the exposed section.

The present disclosure provides a manufacturing method of a compacted strip-shaped electrode plate that can reduce wrinkling of the current collector foil near the boundary between the active material section and the exposed section resulting from pressing the active material layer and the current collector foil by rollers while conveying these in the longitudinal direction, and further provides a compacted strip-shaped electrode plate in which wrinkling of the current collector foil near the boundary between the active material section and the exposed section is reduced, and a high-reliability battery in which wrinkling of the current collector foil near the boundary between the active material section and the exposed section of the compacted strip-shaped electrode plate is reduced.

One aspect of the present disclosure is a manufacturing method of a compacted strip-shaped electrode plate. The compacted strip-shaped electrode plate includes: a strip-shaped current collector foil; and an active material layer that is formed on the current collector foil in a shape of a strip extending in a longitudinal direction of the current collector foil, contains active material particles and conductive particles, and is compacted by being pressed in a thickness direction of the current collector foil. The compacted strip-shaped electrode plate has: an active material section which has a shape of a strip extending in the longitudinal direction and in which the active material layer is provided in the thickness direction; and an exposed section which is located at an end portion, in a width direction, of the current collector foil and has a shape of a strip extending in the longitudinal direction, and in which the current collector foil is exposed without the active material layer being provided in the thickness direction. The active material layer has, in a random distribution: a plurality of first elongated regions which is elongated in the longitudinal direction and in which the content ratio of the conductive particles is W1 (wt %); and a plurality of second elongated regions which is elongated in the longitudinal direction and in which the content ratio of the conductive particles is W2 (wt %), W2 being higher than W1 (W2>W1). The manufacturing method includes: an undried layer forming step of forming, on the current collector foil, an undried active material layer having a shape of a strip extending in the longitudinal direction by rolling out, in the longitudinal direction, a particle aggregate that is an aggregate of wet particles including the active material particles, the conductive particles, and a dispersion medium; a drying step of drying the undried active material layer on the current collector foil to form the active material layer; and a pressing step of pressing the active material layer and the current collector foil by rollers so as to compact the active material layer while conveying the active material layer and the current collector foil in the longitudinal direction. The particle aggregate is a mixed particle aggregate in which are mixed together: first wet particles manufactured with the content ratio of the conductive particles to the total solid content set to W1 (wt %); and second wet particles manufactured with the content ratio of the conductive particles to the total solid content set to W2 (wt %).

Studies conducted by the present inventor have found that the hardness of an active material layer formed in the drying step (before undergoing the pressing step) varies with the content ratio W (wt %) of conductive particles to the total solid content of wet particles used in the undried layer forming step. Specifically, it has been found that the higher the content ratio W of the conductive particles to the total solid content of the wet particles, the lower the hardness of the active material layer formed in the drying step, and that the lower the content ratio W, the higher the hardness of the active material layer formed in the drying step. Generally, conductive particles have a lower bulk density than active material particles. (The bulk density of conductive particles is approximately 0.04 to 0.15 g/ml.) Therefore, a larger amount of conductive particles means a larger amount of void space included in the undried active material layer and the active material layer that is yet to undergo the pressing step. The reason why a higher content ratio W of the conductive particles results in lower hardness of the active material layer seems to be because this void space functions as a stress reliever (functions like a cushion).

In the above-described manufacturing method of a compacted strip-shaped electrode plate (hereinafter also referred to simply as an "electrode plate"), the particle aggregate used in the undried layer forming step is a mixed particle aggregate in which the first wet particles manufactured with the content ratio of the conductive particles to the total solid content set to W1 (wt %) and the second wet particles manufactured with the content ratio of the conductive particles to the total solid content set to W2 (wt %), W2 being higher than W1 (W2>W1), are mixed together. Therefore, the undried active material layer formed by rolling in the undried layer forming step and the active material layer obtained by drying this undried active material layer in the drying step have a form in which the two types of elongated regions (the first elongated regions and the second elongated regions) that derive respectively from the first wet particles and the second wet particles and are each elongated in the longitudinal direction are randomly (irregularly) distributed.

As described above, the higher the content ratio W of the conductive particles to the total solid content of the wet particles, the lower the hardness of the active material layer, and the lower the content ratio W of the conductive particles to the total solid content of the wet particles, the higher the hardness of the active material layer. Accordingly, the first elongated region in which the content ratio of the conductive particles is W1 is relatively hard, while the second elongated region in which the content ratio of the conductive particles is W2 (W2>W1) is relatively soft.

As will be described in detail later, because of the difference between the content ratios W1, W2 of the conductive particles in the first elongated region and the second elongated region, surfaces of the first elongated region and the second elongated region have different reflectances and appear in different colors. It is therefore possible to check that the plurality of first elongated regions and the plurality of second elongated regions are randomly (irregularly) distributed in the active material layer, by examining the regional difference in the reflectance (color) of the surface of the active material layer.

When the active material layer in which the first elongated regions and the second elongated regions different in hardness from each other are thus randomly distributed is pressed by rollers while being conveyed in the longitudinal direction in the pressing step, less wrinkling of the current collector foil occurs near the boundary between the active material section and the exposed section. A possible explanation for this is as follows: The first elongated region and the second elongated region of the active material layer are each long in the longitudinal direction and short in the width direction. When a linear pressure along the width direction is applied to the active material section by roller pressing, most of the load is placed on the plurality of first elongated regions that have relatively high hardness and are present as dots in the width direction. On the other hand, the soft second elongated regions are present on both sides of the hard first elongated region in the width direction. Therefore, portions of the current collector foil that are located directly below the hard first elongated regions are easily stretched in the width direction but hardly stretched in the longitudinal direction in which the hard first elongated regions continue. Accordingly, in the active material section as a whole, the current collector foil is stretched by roller pressing to a large extent in the width direction but to a small extent in the longitudinal direction, compared with the current collector foil in the active material section of the related art in which the hardness of the active material layer is constant throughout the entire surface. This seems to be why less wrinkling of the current collector foil occurs near the boundary between the active material section and the exposed section as a result of roller pressing.

The term "compacted strip-shaped electrode plate" covers a strip-shaped positive electrode plate having a positive electrode active material layer containing positive electrode active material particles as an active material layer, and a strip-shaped negative electrode plate having a negative electrode active material layer containing negative electrode active material particles as an active material layer. The term "compacted strip-shaped electrode plate" further covers an electrode plate in which an exposed section is formed at each end portion in the width direction, and an electrode plate in which an exposed section is formed at only either end portion in the width direction. Examples of conductive particles include particles of acetylene black, carbon black, Ketjen black, graphene, and carbon nanofiber.

In the above-described manufacturing method of a compacted strip-shaped electrode plate, the conductive particles may be acetylene black particles.

In this manufacturing method of an electrode plate described above, acetylene black (AB) particles are used as the conductive particles. Thus, good conductivity of the active material layer can be secured, and it is easy to form the first wet particles and the second wet particles different from each other in hardness after drying, by setting the content ratios W1, W2 of the conductive particles (AB particles) in these wet particles to different ratios.

In any one of the above-described manufacturing methods of a compacted strip-shaped electrode plate, a difference $\Delta W$ ($=W2-W1$) between the content ratio W2 of the conductive particles in the second wet particles and the content ratio W1 of the conductive particles in the first wet particles may satisfy a following condition: $\Delta W$ 0.8 wt %.

If the difference $\Delta W$ ($=W2-W1$) between the content ratio W2 of the conductive particles in the second wet particles and the content ratio W1 of the conductive particles in the first wet particles is too small, specifically, if the difference $\Delta W$ is smaller than 0.8 wt % ($\Delta W<0.8$ wt %), there will be only a small difference in hardness between the first elongated regions and the second elongated regions randomly distributed in the active material layer before the pressing step. The smaller the difference in hardness between the first elongated region and the second elongated region becomes, the closer the active material layer becomes to that in the related art of which the hardness of the active material layer is constant throughout the entire surface. As a result, the restraining effect on stretching in the longitudinal direction of the current collector foil in the active material section during roller pressing is likely to be reduced, and so is the reducing effect on wrinkling of the current collector foil near the boundary between the active material section and the exposed section.

In the above-described manufacturing method of an electrode plate, however, the difference $\Delta W$ between the content ratio W2 of the conductive particles in the second wet particles and the content ratio W1 of the conductive particles in the first wet particles is set to 0.8 wt % or higher ($\Delta W \geq 0.8$ wt %), thus creating a sufficiently great difference in hardness between the first elongated regions and the second elongated regions in the active material layer before the pressing step. Accordingly, the restraining effect on stretching in the longitudinal direction of the current collector foil in the active material section during roller pressing is sufficiently great, so that wrinkling of the current collector foil near the boundary between the active material section and the exposed section can be reduced more effectively. It is especially preferable that the difference $\Delta W$ between the content ratios W1, W2 of the conductive particles further satisfy the following condition: $\Delta W \geq 2.8$ wt %.

In any one of the above-described manufacturing methods of a compacted strip-shaped electrode plate, the mixed particle aggregate may have the first wet particles and the second wet particles mixed together at a weight ratio of 65:35 to 35:65.

In this manufacturing method of an electrode plate, the first wet particles and the second wet particles are mixed together in roughly equal amounts (at a weight ratio of 65:35 to 35:65) in the mixed particle aggregate. Accordingly, the first elongated regions and the second elongated regions are randomly distributed in roughly equal amounts (at an area ratio of 65:35 to 35:65) in the active material layer formed in the drying step. When such an active material layer is pressed by rollers in the pressing step, wrinkling of the current collector foil near the boundary between the active material section and the exposed section can be reduced more favorably.

In any one of the above-described manufacturing methods of a compacted strip-shaped electrode plate, the undried layer forming step may have: a film forming step of rolling out the mixed particle aggregate by passing the mixed particle aggregate through a first roller gap between a first roller and a second roller disposed parallel to the first roller, so as to form the undried active material layer as a film on the second roller; and a transfer step of transferring the undried active material layer from the second roller onto the current collector foil that has been passed through a second roller gap between the second roller and a third roller disposed parallel to the second roller.

In this manufacturing method of an electrode plate, the wet particles (the first wet particles and the second wet particles) are each rolled out in the longitudinal direction in the film forming step of the undried layer forming step, and the undried active material layer is transferred onto the current collector foil in the transfer step of the undried layer forming step. Thus, it is easy to form the undried active material layer, and further the active material layer, in which the first elongated regions formed by the first wet particles and elongated in the longitudinal direction and the second elongated regions formed by the second wet particles and elongated in the longitudinal direction are randomly distributed.

Another aspect of the present disclosure is a compacted strip-shaped electrode plate including: a strip-shaped current collector foil; and an active material layer that is formed on the current collector foil in a shape of a strip extending in a longitudinal direction of the current collector foil, contains active material particles and conductive particles, and is compacted by being pressed in a thickness direction of the current collector foil. The compacted strip-shaped electrode plate has: an active material section which has a shape of a strip extending in the longitudinal direction and in which the active material layer is provided in the thickness direction; and an exposed section which is located at an end portion, in a width direction, of the current collector foil and has a shape of a strip extending in the longitudinal direction, and in which the current collector foil is exposed without the active material layer being provided in the thickness direction. The active material layer has, in a random distribution: a plurality of first elongated regions which is elongated in the longitudinal direction and in which the content ratio of the conductive particles is W1 (wt %); and a plurality of second elongated regions which is elongated in the longitudinal direction and in which the content ratio of the conductive particles is W2 (wt %), W2 being higher than W1 (W2>W1).

In this compacted strip-shaped electrode plate, wrinkling of the current collector foil near the boundary between the active material section and the exposed section is reduced. Therefore, if this electrode plate is used to form an electrode body and this electrode body is further used to form a battery, a high-reliability battery can be produced.

In the above-described compacted strip-shaped electrode plate, the conductive particles may be acetylene black particles.

In this compacted strip-shaped electrode plate, acetylene black (AB) particles are used as the conductive particles, so that good conductivity of the active material layer can be secured.

In any one of the above-described compacted strip-shaped electrode plates, a difference $\Delta W$ (=W2−W1) between the content ratio W2 of the conductive particles in the second elongated regions and the content ratio W1 of the conductive particles in the first elongated regions may satisfy the following condition: $\Delta W \geq 0.8$ wt %.

In this electrode plate, the difference $\Delta W$ between the content ratio W2 of the conductive particles in the second elongated regions and the content ratio W1 of the conductive particles in the first elongated regions is set to 0.8 wt % or higher ($\Delta W \geq 0.8$ wt %), so that wrinkling of the current collector foil near the boundary between the active material section and the exposed section is reduced more effectively. Therefore, if this electrode plate is used to form an electrode body and this electrode body is further used to form a battery, a high-reliability battery can be produced. It is especially preferable that the difference $\Delta W$ between the content ratios W1, W2 of the conductive particles further satisfy the following condition: $\Delta W \geq 2.8$ wt %.

In any one of the above-described compacted strip-shaped electrode plates, the active material layer may have the first elongated regions and the second elongated regions randomly distributed at an area ratio of 65:35 to 35:65.

In this electrode plate, the active material layer has the first elongated regions and the second elongated regions randomly distributed in roughly equal amounts (at an area ratio of 65:35 to 35:65), so that wrinkling of the current collector foil near the boundary between the active material section and the exposed section is reduced more favorably. Therefore, if this electrode plate is used to form an electrode body and this electrode body is further used to form a battery, a high-reliability battery can be produced.

Yet another aspect of the present disclosure is a battery including an electrode body that employs any one of the above-described compacted strip-shaped electrode plates.

This battery employs the above-described compacted strip-shaped electrode plate, i.e., the electrode plate in which wrinkling of the current collector foil near the boundary between the active material section and the exposed section is reduced. Therefore, this battery is highly reliable. Examples of the electrode body include a cylindrical or flat rolled electrode body formed by using the compacted strip-shaped electrode plate as is in the strip shape, and a stacked electrode body formed by using the compacted strip-shaped electrode plate cut into a predetermined shape, such as a rectangular shape.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
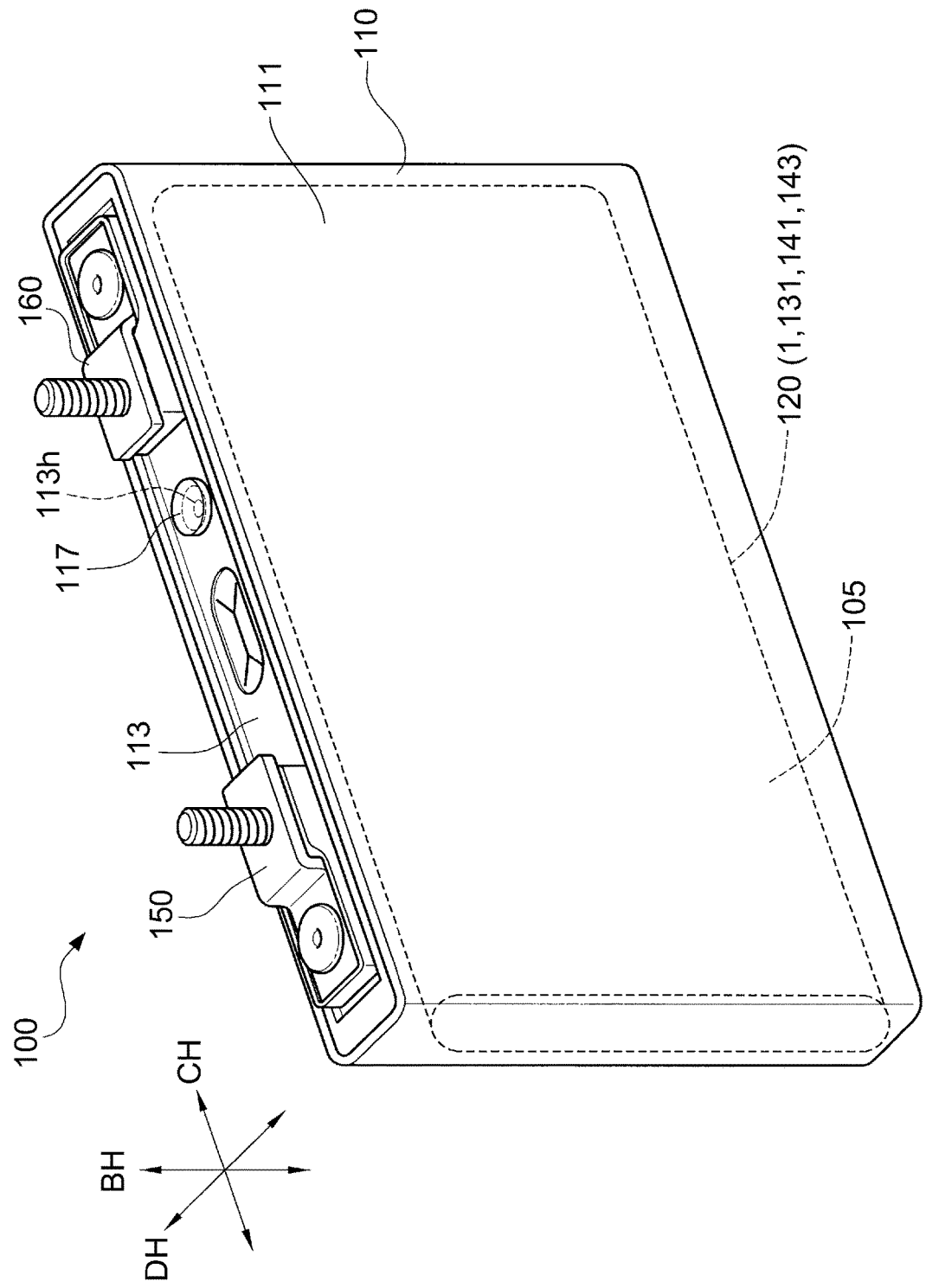
FIG. 1 is a perspective view of a battery according to an embodiment.
Figure 2:
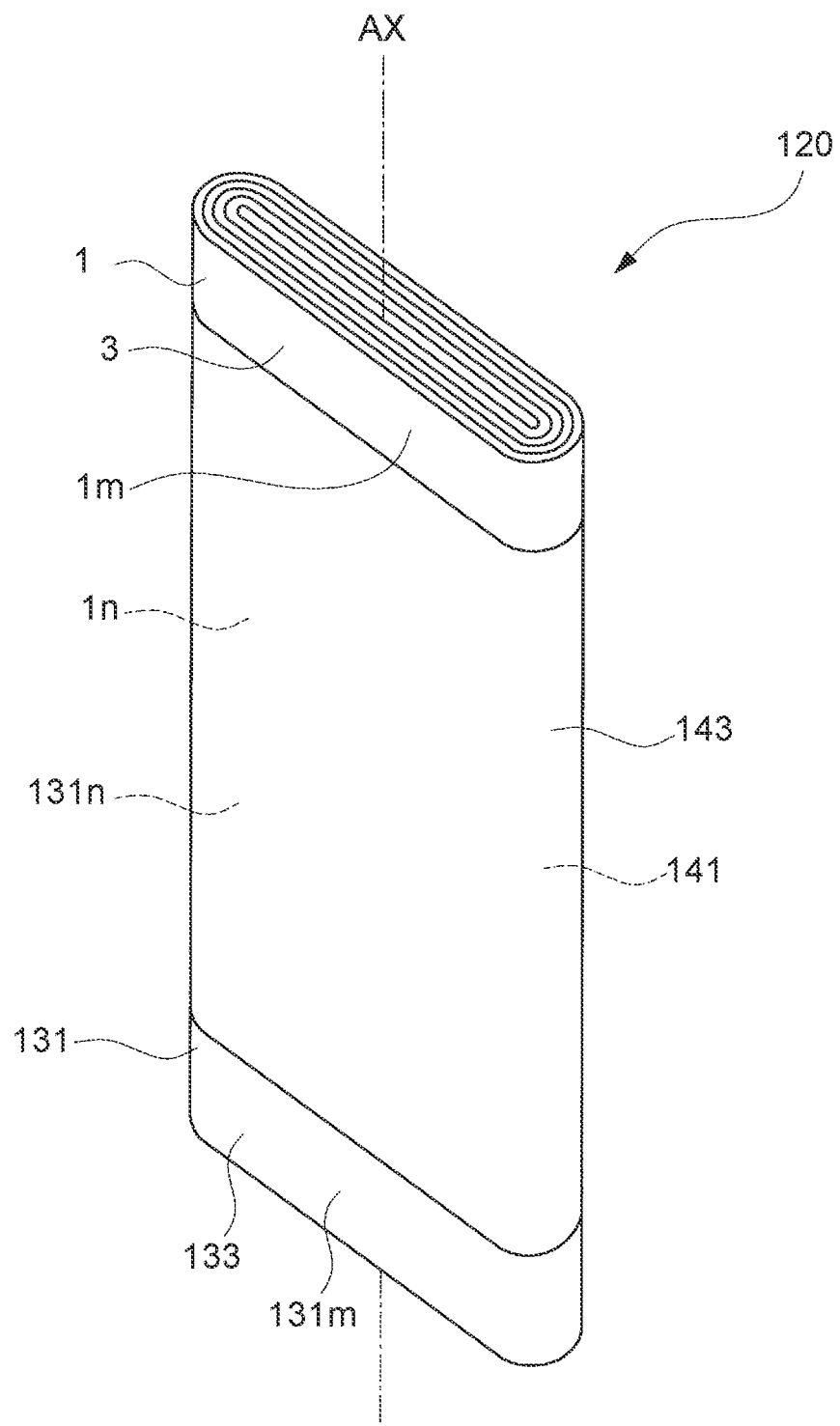
FIG. 2 is a perspective view of an electrode body according to the embodiment.
Figure 3:
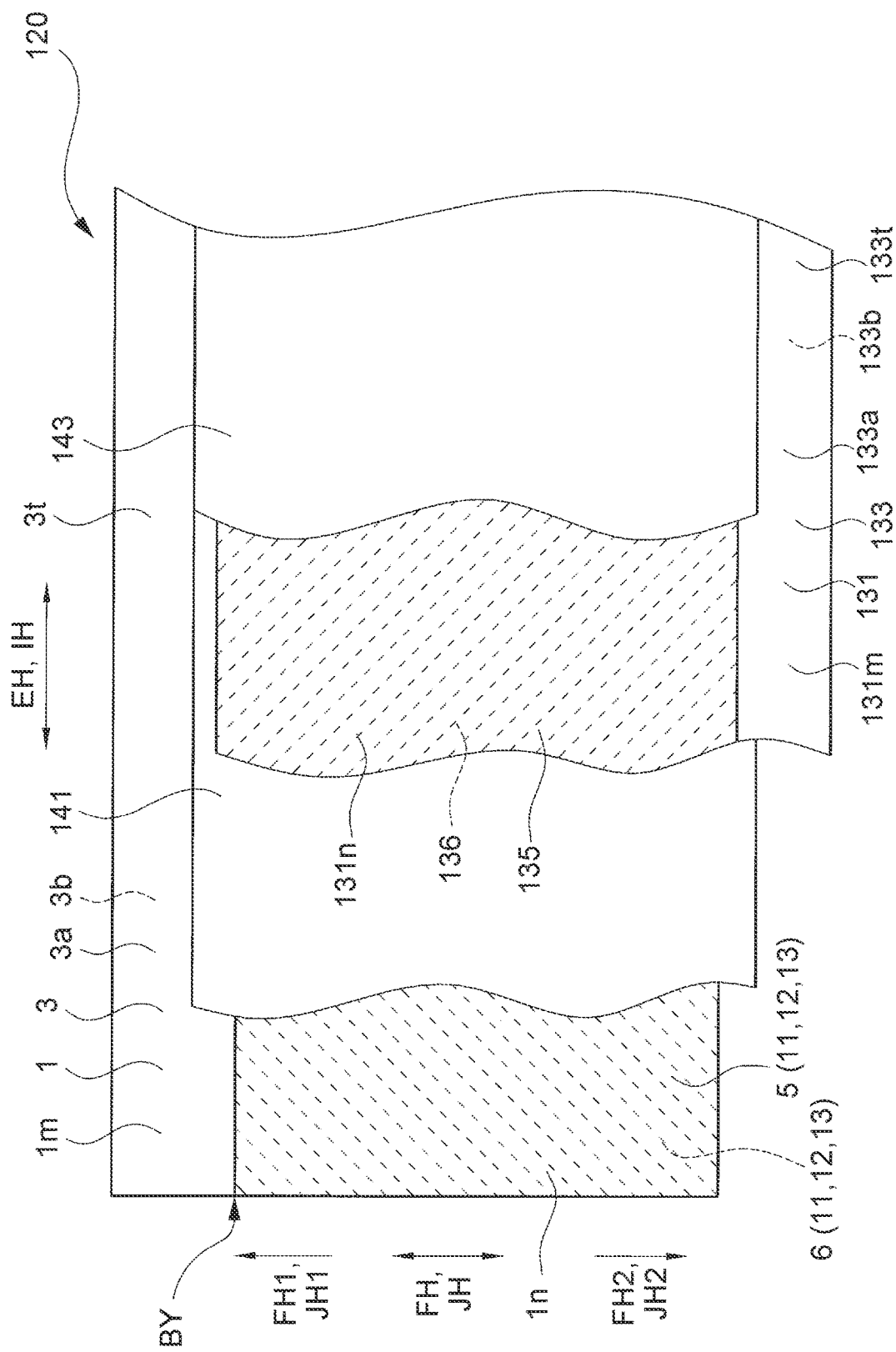
FIG. 3 is a developed view of the electrode body according to the embodiment.

An embodiment of the present disclosure will be described below with reference to the drawings. FIG. 1 is a perspective view of a battery 100 according to the embodiment. FIG. 2 is a perspective view of an electrode body 120 constituting part of the battery 100, and FIG. 3 is a developed view of the electrode body 120. For the following description, a vertical direction BH, a lateral direction CH, and a thickness direction DH of the battery 100 are defined as the directions shown in FIG. 1. The battery 100 is a rectangular sealed lithium-ion secondary battery that is installed in a vehicle such as a hybrid vehicle, a plug-in hybrid vehicle, or an electric vehicle. The battery 100 is composed of a rectangular battery case 110, the flat rolled electrode body 120 and an electrolyte 105 that are housed inside the battery case 110, a positive electrode terminal member 150 and a negative electrode terminal member 160 that are supported on the battery case 110, etc. (see FIG. 1).

Of these components, the battery case 110 has a cuboid box shape and is made of metal (aluminum, in this embodiment). The battery case 110 is composed of a one-end-closed rectangular tubular case main body member 111 that is open on only an upper side, and a rectangular plate-shaped case lid member 113 that is welded in such a form as to close the opening of the case main body member 111. The positive electrode terminal member 150 made of aluminum is fixedly installed on the case lid member 113 in a state of being insulated from the case lid member 113. The positive electrode terminal member 150 is connected to a compacted strip-shaped positive electrode plate (compacted strip-shaped electrode plate) 1 (hereinafter also referred to simply as a "positive electrode plate 1") of the electrode body 120 (see also FIG. 2 and FIG. 3) inside the battery case 110 and conducts electricity, while extending through the case lid member 113 to an outside of the battery. The negative electrode terminal member 160 made of copper is fixedly installed on the case lid member 113 in a state of being insulated from the case lid member 113. The negative electrode terminal member 160 is connected to a compacted strip-shaped negative electrode plate 131 (hereinafter also referred to simply as a "negative electrode plate 131") of the electrode body 120 inside the battery case 110, while extending through the case lid member 113 to the outside of the battery.

The electrode body 120 (see FIG. 1 to FIG. 3) has a flat shape and is housed inside the battery case 110 in a laid-down state. The electrode body 120 is a flat rolled electrode body formed by placing the positive electrode plate 1 and the negative electrode plate 131 on top of each other, alternately with a pair of strip-shaped separators 141, 143, and then rolling this electrode-separator assembly around an axis AX into a flat shape. Of these components, the positive electrode plate 1 is separately shown in FIG. 4 that is a perspective view and FIG. 5 that is an enlarged plan view of part of a first positive electrode active material layer 5 (or a second positive electrode active material layer 6). For the following description, a longitudinal direction EH, a width direction FH, and a thickness direction GH of the positive electrode plate 1 and a positive electrode current collector foil 3 constituting part of the positive electrode plate 1 are defined as the directions shown in FIG. 4 and FIG. 5.

The positive electrode plate 1 has the positive electrode current collector foil 3 that is formed by an aluminum foil having a shape of a strip extending in the longitudinal direction EH. The first positive electrode active material layer 5 is formed in a strip shape in the longitudinal direction EH on a first principal surface 3a of the positive electrode current collector foil 3, except for an end portion 3t on one side FH1 of the positive electrode current collector foil 3 in the width direction FH (an upper side in FIG. 3; an upper left side in FIG. 4). The second positive electrode active material layer 6 is formed in a strip shape in the longitudinal direction EH on a second principal surface 3b on the opposite side of the positive electrode current collector foil 3, except for the end portion 3t of the positive electrode current collector foil 3. The first positive electrode active material layer 5 and the second positive electrode active material layer 6 are each pressed and compacted in the thickness direction GH.

Of the positive electrode plate 1, an end portion 1m on the one side FH1 in the width direction FH constitutes a positive electrode exposed section 1m which has a shape of a strip extending in the longitudinal direction EH, and in which the positive electrode current collector foil 3 is exposed without the first positive electrode active material layer 5 and the second positive electrode active material layer 6 being provided in the thickness direction GH. In a constructed state of the battery 100, the positive electrode exposed section 1*m* has the positive electrode terminal member 150 welded thereto. On the other hand, a portion of the positive electrode plate 1 on the other side FH2 in the width direction FH except for the end portion 1*m* on the one side FH1 constitutes a positive electrode active material section 1*n* which has a shape of a strip extending in the longitudinal direction EH, and in which the first positive electrode active material layer 5 and the second positive electrode active material layer 6 are provided in the thickness direction GH.

The first positive electrode active material layer 5 and the second positive electrode active material layer 6 are each composed of positive electrode active material particles 11, conductive particles 12, and a binder 13. In this embodiment, the positive electrode active material particles 11 are positive electrode active material particles into and from which lithium ions can be inserted and separated, and are specifically lithium nickel cobalt manganese oxide particles that are a type of lithium transition metal composite oxide particles. The conductive particles 12 are carbon-based conductive particles made of a carbon-based material, specifically acetylene black (AB) particles. The binder 13 is polyvinylidene difluoride (PVDF). In the first positive electrode active material layer 5 as a whole (or the second positive electrode active material layer 6 as a whole), the weight ratio of the positive electrode active material particles 11, the conductive particles 12, and the binder 13 is 94.5:4.0:1.5.

Figure 5:
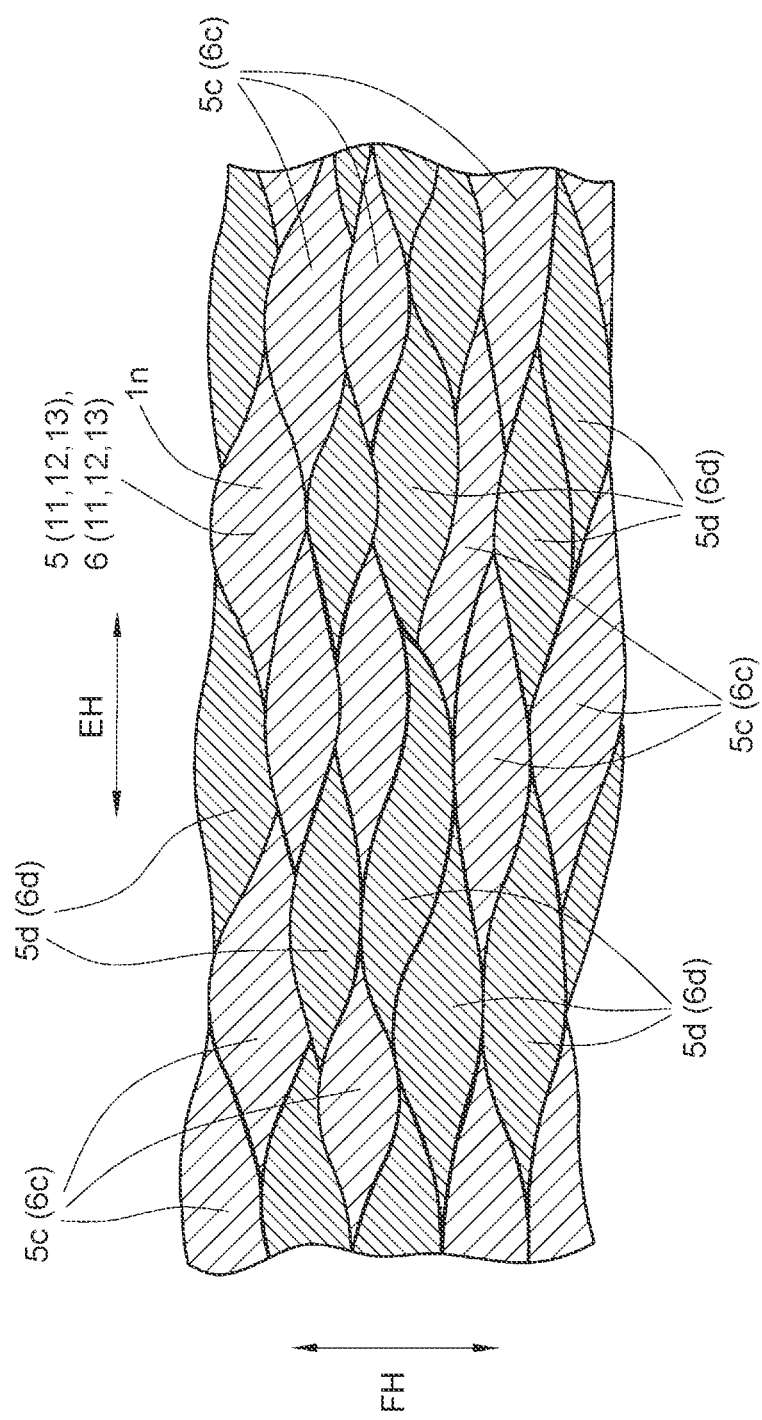
FIG. 5 is an enlarged plan view of part of a first positive electrode active material layer (or a second positive electrode active material layer) of the compacted strip-shaped positive electrode plate according to the embodiment.

As schematically shown in FIG. 5, a plurality of first elongated regions 5*c* and a plurality of second elongated regions 5*d* are randomly (irregularly) distributed in the first positive electrode active material layer 5. The area ratio of the first elongated regions 5*c* and the second elongated regions 5*d* in the first positive electrode active material layer 5 is within a range of 65:35 to 35:65, and is 50:50 in this embodiment. Each of the first elongated regions 5*c* and the second elongated regions 5*d* is elongated in the longitudinal direction EH. The content ratio W2 of the conductive particles 12 in the second elongated region 5*d* is higher than the content ratio W1 of the conductive particles 12 in the first elongated region 5*c* (W2>W1), and the difference ΔW (=W2−W1) between the content ratios W1, W2 satisfies the condition ΔW≥0.8 wt %, and further satisfies the condition ΔW≥2.8 wt %. In this embodiment, the content ratios W1, W2 of the conductive particles 12 are 2.2 wt % and 5.8 wt %, respectively, and thus the difference therebetween is: ΔW=5.8−2.2=3.6 wt %.

The first elongated region 5*c* has the low content ratio W1 of the conductive particles 12 (W1=2.2 wt %), but has a high content ratio of the positive electrode active material particles 11 (96.3 wt %, in this embodiment). Conversely, the second elongated region 5*d* has the high content ratio W2 of the conductive particles 12 (W2=5.8 wt %), but has a low content ratio of the positive electrode active material particles 11 (92.7 wt %, in this embodiment). On the other hand, the content ratio of the binder 13 is 1.5 wt % in both the first elongated region 5*c* and the second elongated region 5*d*.

Similarly, a plurality of first elongated regions 6*c* and a plurality of second elongated regions 6*d* each elongated in the longitudinal direction EH are randomly (irregularly) distributed in the second positive electrode active material layer 6. As in the first positive electrode active material layer 5, the area ratio of the first elongated regions 6*c* and the second elongated regions 6*d* in the second positive electrode active material layer 6 is 50:50. The content ratio W1 of the conductive particles 12 in the first elongated region 6*c* is 2.2 wt %, and the content ratio W2 of the conductive particles 12 in the second elongated region 6*d* is 5.8 wt %, and thus the difference ΔW between the content ratios W1, W2 is 3.6 wt %.

Here, the state of distribution of the first elongated regions 5*c* and the second elongated regions 5*d* (the first elongated regions 6*c* and the second elongated regions 6*d*) in the first positive electrode active material layer 5 (or the second positive electrode active material layer 6) of the positive electrode plate 1 can be examined using a grayscale image representing a surface of the first positive electrode active material layer 5 (or the second positive electrode active material layer 6). The AB particles constituting conductive particles 12 have extremely low reflectance. On the other hand, containing nickel and cobalt, the positive electrode active material particles 11 have high reflectance. Therefore, those portions of the surface of the first positive electrode active material layer 5 (or the second positive electrode active material layer 6) that have a large amount of conductive particles 12 and a small amount of positive electrode active material particles 11 look blackish due to the low reflectance, whereas those portions that have a small amount of conductive particles 12 and a large amount of positive electrode active material particles 11 look whitish due to the high reflectance. Specifically, the first elongated regions 5*c*, 6*c* have a small amount of conductive particles 12 and a large amount of positive electrode active material particles 11, which makes the surfaces of these regions look whitish. On the other hand, the second elongated regions 5*d*, 6*d* have a large amount of conductive particles 12 and a small amount of positive electrode active material particles 11, which makes the surfaces of these regions look blackish. It is therefore possible to check the state of distribution of the first elongated regions 5*c*, 6*c* and the second elongated regions 5*d*, 6*d* by examining a grayscale image representing the surface of the first positive electrode active material layer 5 (or the second positive electrode active material layer 6).

Next, the negative electrode plate 131 will be described (see FIG. 3). The negative electrode plate 131 has a negative electrode current collector foil 133 that is formed by a copper foil having a shape of a strip extending in the longitudinal direction IH. A first negative electrode active material layer 135 is formed in a strip shape in the longitudinal direction IH on a first principal surface 133*a* of the negative electrode current collector foil 133, except for an end portion 133*t* on the other side JH2 of the negative electrode current collector foil 133 in the width direction JH (the lower side in FIG. 3). A second negative electrode active material layer 136 is formed in a strip shape in the longitudinal direction IH on a second principal surface 133*b* on the opposite side of the negative electrode current collector foil 133, except for the end portion 133*t* of the negative electrode current collector foil 133. The first negative electrode active material layer 135 and the second negative electrode active material layer 136 are each pressed and compacted in the thickness direction.

The first negative electrode active material layer 135 and the second negative electrode active material layer 136 are each composed of negative electrode active material particles, a binder, and a thickener. Unlike in the first positive electrode active material layer 5 and the second positive electrode active material layer 6, the content ratios of these components (the negative electrode active material particles, the binder, and the thickener) are constant throughout the entire surfaces of the first negative electrode active material layer 135 and the second negative electrode active material layer 136.

An end portion 131m of the negative electrode plate 131 on the other side JH2 in the width direction JH constitutes a negative electrode exposed section 131m which has a shape of a strip extending in the longitudinal direction IH, and in which the negative electrode current collector foil 133 is exposed without the first negative electrode active material layer 135 and the second negative electrode active material layer 136 being provided in the thickness direction. In a constructed state of the battery 100, the negative electrode exposed section 131m has the negative electrode terminal member 160 welded thereto. On the other hand, a portion of the negative electrode plate 131 on the one side JH1 in the width direction JH except for the end portion 131m on the other side JH2 constitutes a negative electrode active material section 131n which has a shape of a strip extending in the longitudinal direction IH, and in which the first negative electrode active material layer 135 and the second negative electrode active material layer 136 are provided in the thickness direction.

As will be described later, wrinkling of the positive electrode current collector foil 3 near a boundary BY between the positive electrode active material section 1n and the positive electrode exposed section 1m is reduced in the compacted strip-shaped positive electrode plate 1 of this embodiment. Therefore, the battery 100 including the electrode body 120 employing this positive electrode plate 1 is a high-reliability battery.

Since AB particles are used as the conductive particles 12 in the positive electrode plate 1 of this embodiment, good conductivity of the first positive electrode active material layer 5 and the second positive electrode active material layer 6 can be secured. In the first positive electrode active material layer 5 and the second positive electrode active material layer 6 of the positive electrode plate 1 of this embodiment, the difference $\Delta W$ (=W2−W1) between the content ratio W2 of the conductive particles 12 in the second elongated regions 5d, 6d and the content ratio W1 of the conductive particles 12 in the first elongated regions 5c, 6c is set to 0.8 wt % or higher, and further set to 2.8 wt % or higher ($\Delta W$=3.6 wt %, in this embodiment). Thus, wrinkling of the positive electrode current collector foil 3 near the boundary BY between the positive electrode active material section 1n and the positive electrode exposed section 1m is reduced more effectively. Therefore, the battery 100 including the electrode body 120 that employs this positive electrode plate 1 is a higher-reliability battery.

In this embodiment, the first elongated regions 5c, 6c and the second elongated regions 5d, 6d are randomly distributed in roughly equal amounts (at an area ratio of 65:35 to 35:65) in the first positive electrode active material layer 5 and the second positive electrode active material layer 6. Thus, wrinkling of the positive electrode current collector foil 3 near the boundary BY between the positive electrode active material section 1n and the positive electrode exposed section 1m is reduced more effectively. Therefore, the battery 100 including the electrode body 120 that employs this positive electrode plate 1 is a higher-reliability battery.

Figure 6:
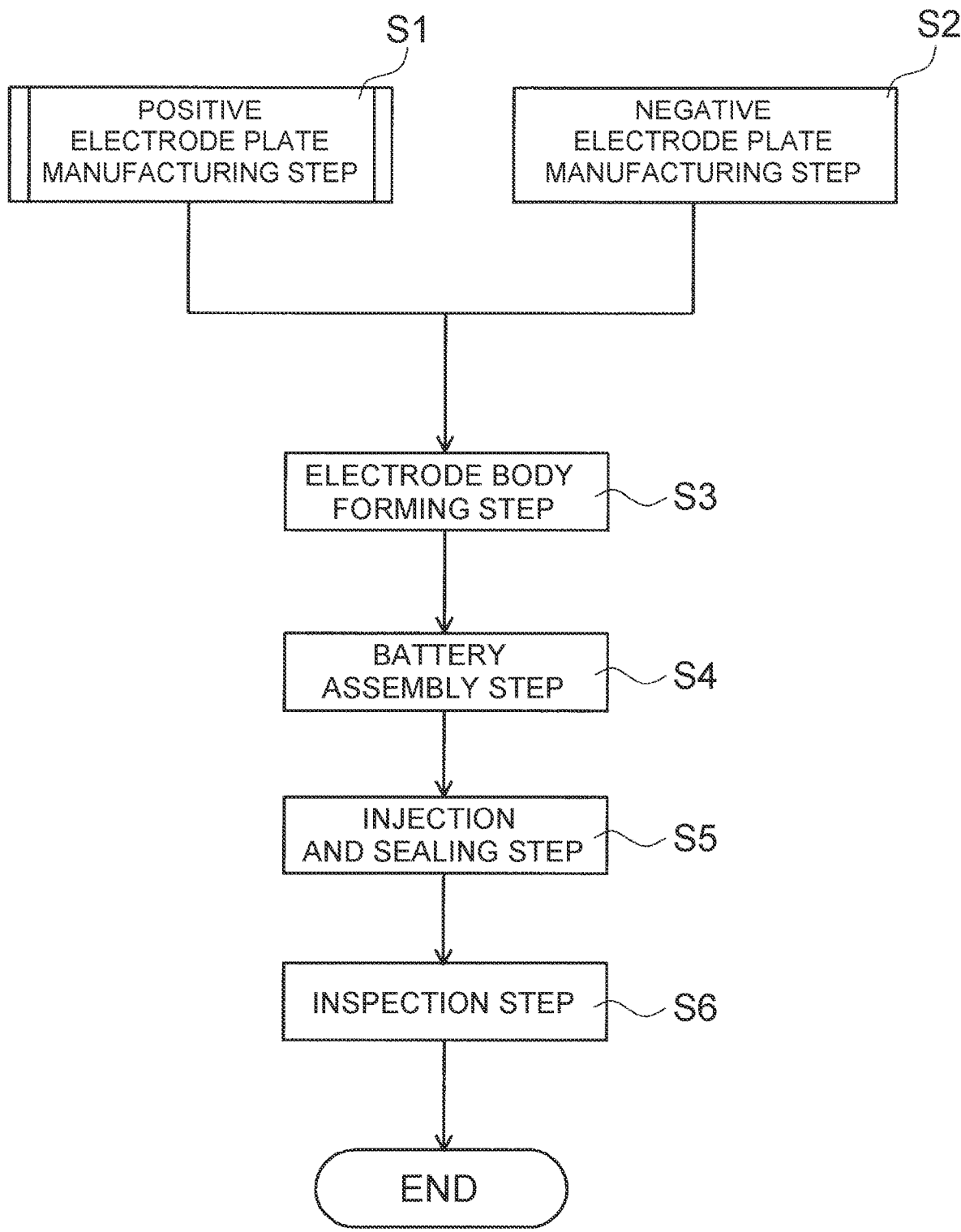
FIG. 6 is a flowchart of a battery manufacturing method according to the embodiment.
Figure 7:
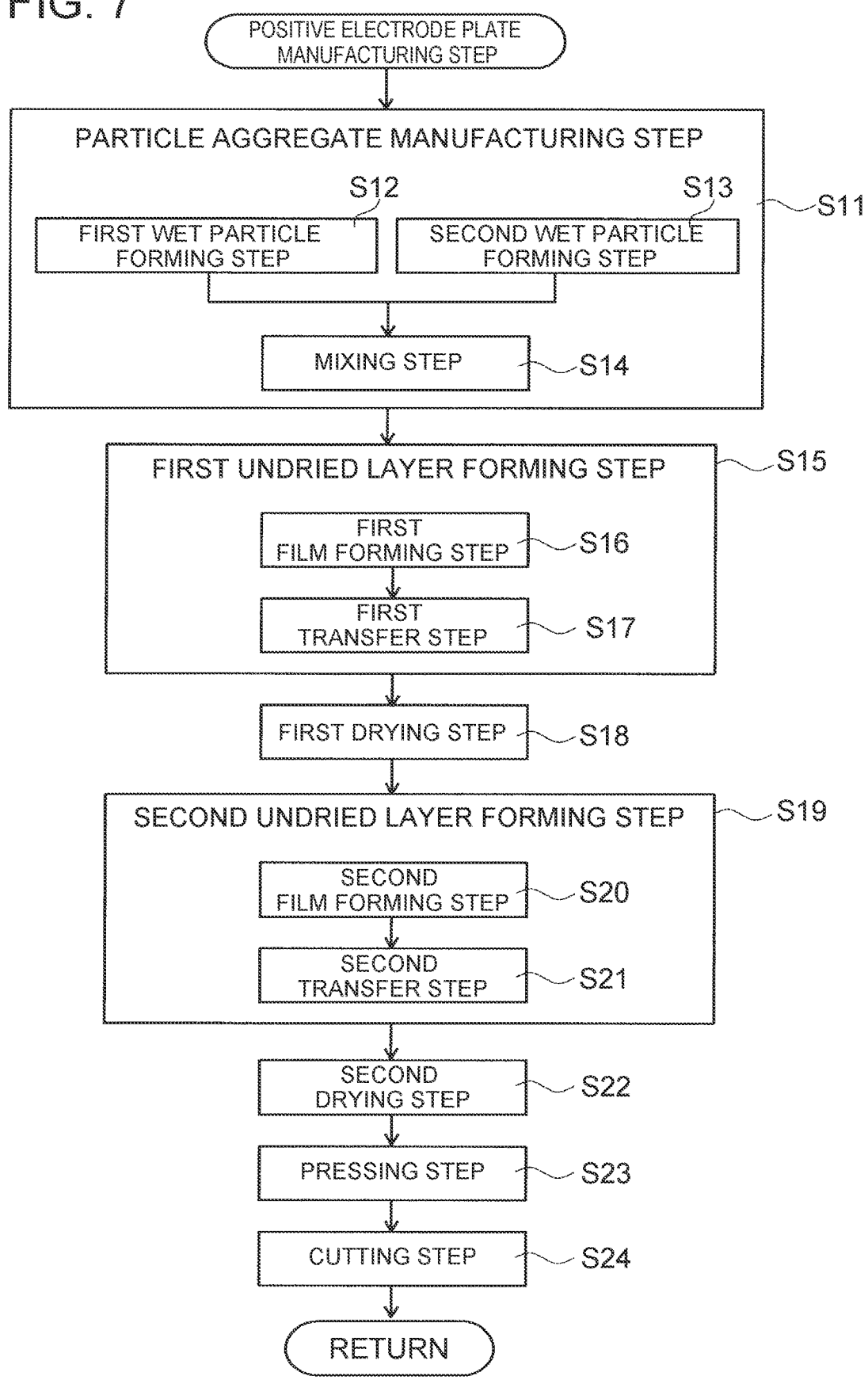
FIG. 7 is a flowchart of a subroutine of a positive electrode plate manufacturing step according to the embodiment.

Next, a manufacturing method of the compacted strip-shaped positive electrode plate 1 and a manufacturing method of the battery 100 using this compacted strip-shaped positive electrode plate 1 will be described (see FIG. 6 to FIG. 8). First, in a "positive electrode plate manufacturing step S1," the compacted strip-shaped positive electrode plate 1 is manufactured. Specifically, in a "particle aggregate manufacturing step S11" (see FIG. 7) of the positive electrode plate manufacturing step S1, a mixed particle aggregate 25 composed of two types of wet particles (first wet particles 21 and second wet particles 23) is manufactured.

In a "first wet particle forming step S12" of the particle aggregate manufacturing step S11, the first wet particles 21 are formed. Specifically, by using a stirring mixing-granulating device (not shown) capable of mixing and granulating materials, the positive electrode active material particles 11, the conductive particles 12, and a binder-dispersed liquid obtained by dispersing the binder 13 in the dispersion medium 14, are mixed together and granulated to form a clay-like mixture that constitutes the first wet particles 21. The average particle diameter of the first wet particles 21 is about 2 mm. In this embodiment, the positive electrode active material particles 11 are lithium nickel cobalt manganese oxide particles, the conductive particles 12 are AB particles, and the binder 13 is PVDF as described above. N-methylpyrrolidone (NMP) is used as the dispersion medium 14.

To form the first wet particles 21, the weight ratio of the positive electrode active material particles 11, the conductive particles 12, the binder 13, and the dispersion medium 14 is set to 96.3:2.2:1.5:20.0. Thus, the content ratio of the positive electrode active material particles 11 to the total solid content of the first wet particles 21 is 96.3 wt %, and the content ratio W1 of the conductive particles 12 to the total solid content of the first wet particles 21 is 2.2 wt %.

In a "second wet particle forming step S13" of the particle aggregate manufacturing step S11, the second wet particles 23 are separately formed. Specifically, by using a similar stirring mixing-granulating device (not shown), the positive electrode active material particles 11, the conductive particles 12, and a binder-dispersed liquid obtained by dispersing the binder 13 in the dispersion medium 14, are mixed together and granulated to form a clay-like mixture that constitutes the second wet particles 23. The average particle diameter of the second wet particles 23 is also about 2 mm. The positive electrode active material particles 11, the conductive particles 12, the binder 13, and the dispersion medium 14 used to form the second wet particles 23 are the same as those used to form the first wet particles 21.

However, to form the second wet particles 23, the weight ratio of the positive electrode active material particles 11, the conductive particles 12, the binder 13, and the dispersion medium 14 is set to 92.7:5.8:1.5:20.0. Thus, the content ratio of the positive electrode active material particles 11 to the total solid content of the second wet particles 23 is 92.7 wt %, lower than that in the first wet particles 21 (96.3 wt %). The content ratio W2 of the conductive particles 12 to the total solid content of the second wet particles 23 is 5.8 wt %, higher than that in the first wet particles 21 (W1=2.2 wt %).

Next, in a "mixing step S14" of the particle aggregate manufacturing step S11, the first wet particles 21 and the second wet particles 23 are mixed together at a weight ratio of 65:35 to 35:65 (a weight ratio of 50:50, in this embodiment) to obtain the mixed particle aggregate 25.

Next, in a "first undried layer forming step S15" (see FIG. 7), a first undried active material layer 5x having a shape of a strip extending in the longitudinal direction EH is formed on the positive electrode current collector foil 3 by rolling out the above described mixed particle aggregate 25 in the longitudinal direction EH. The first undried layer forming step S15 is performed by using a roller pressing device 200 (see FIG. 8). The roller pressing device 200 has three rollers, specifically, a first roller 210, a second roller 220 disposed parallel to the first roller 210 with a first roller gap G1 left therebetween, and a third roller 230 disposed parallel to the second roller 220 with a second roller gap G2 left therebetween. Each of the first roller 210 to the third roller 230 is coupled to a motor (not shown) that drives the roller to rotate. The roller pressing device 200 further has, on an upper side of the first roller gap G1 between the first roller 210 and the second roller 220, an aggregate feeding part 240 that feeds the mixed particle aggregate 25 composed of the first wet particles 21 and the second wet particles 23 toward the first roller gap G1.

Figure 8:
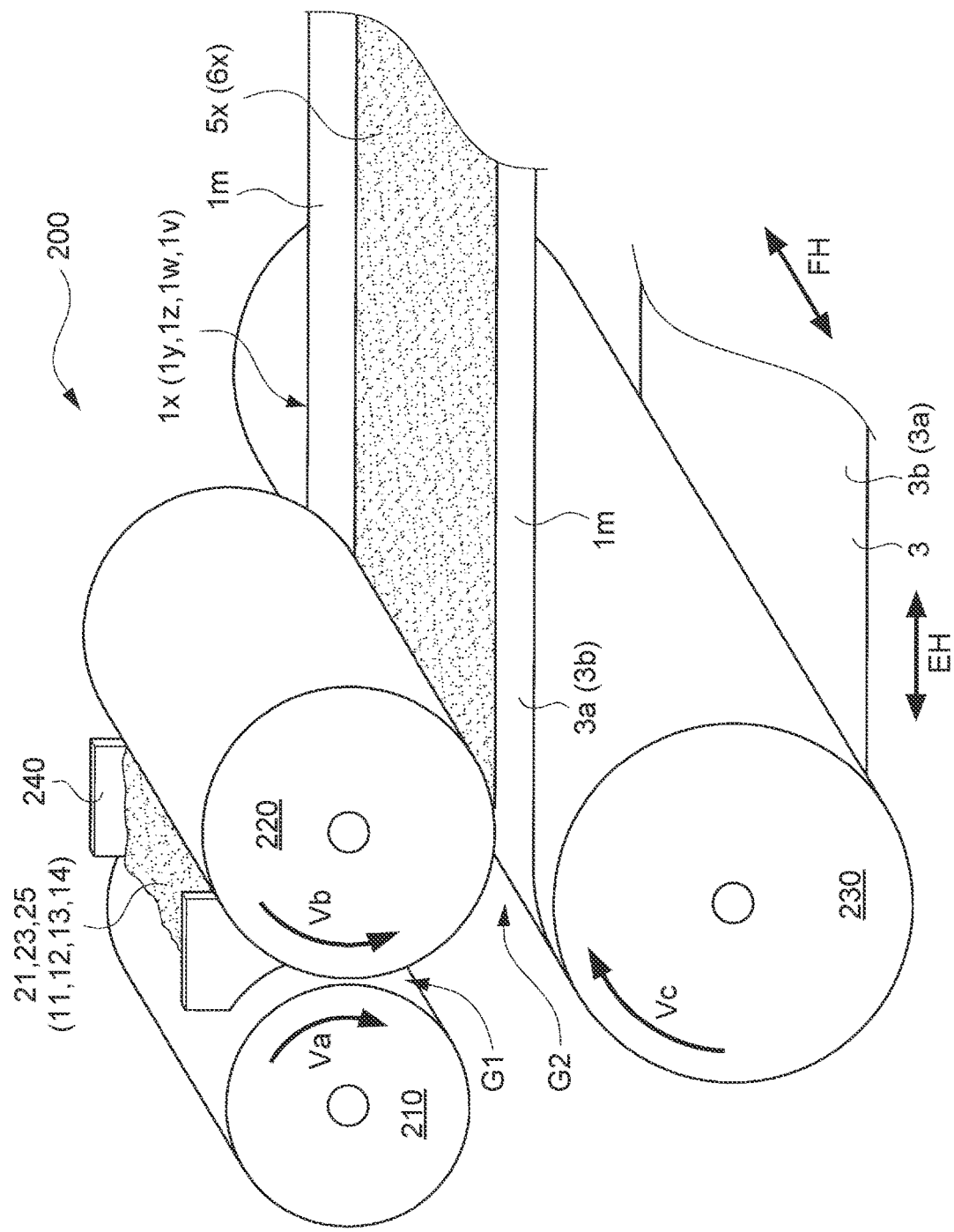
FIG. 8 is a view illustrating how an undried active material layer is formed on a current collector foil by means of a roller pressing device, according to the embodiment.

To perform the first undried layer forming step S15, the first roller 210 to the third roller 230 are rotated respectively in the rotation directions indicated by the arrows in FIG. 8. Specifically, the first roller 210 and the third roller 230 are rotated in the same rotation direction (clockwise, in this embodiment), while the second roller 220 is rotated in the opposite direction (counterclockwise, in this embodiment). A circumferential velocity Vb of the second roller 220 is set to be higher than a circumferential velocity Va of the first roller 210, and a circumferential velocity Vc of the third roller 230 is set to be higher than the circumferential velocity Vb of the second roller 220 (Va<Vb<Vc).

First, in a "first film forming step S16" of the first undried layer forming step S15, the mixed particle aggregate 25 is passed through the first roller gap G1 between the first roller 210 and the second roller 220 so as to roll out the mixed particle aggregate 25 and form the first undried active material layer 5x as a film on the second roller 220. Specifically, the mixed particle aggregate 25 inside the aggregate feeding part 240 is fed toward the first roller gap G1 between the first roller 210 and the second roller 220, rolled out by the first roller 210 and the second roller 220 into the first undried active material layer 5x in a film state, pushed out toward the lower side in FIG. 8, and thus a film is formed on the second roller 220. The first undried active material layer 5x on the second roller 220 is conveyed toward the third roller 230.

Subsequently, in a "first transfer step S17" of the first undried layer forming step S15, the first undried active material layer 5x is transferred from the second roller 220 onto the positive electrode current collector foil 3 that has been passed through the second roller gap G2 between the second roller 220 and the third roller 230. Specifically, the positive electrode current collector foil 3 drawn from a feed roller (not shown) is wound around the third roller 230, and the positive electrode current collector foil 3 is conveyed by the third roller 230. The positive electrode current collector foil 3 having been conveyed by the third roller 230 comes into contact with the first undried active material layer 5x on the second roller 220 between the second roller 220 and the third roller 230. Then, the first undried active material layer 5x is transferred onto the first principal surface 3a of the positive electrode current collector foil 3 between the second roller 220 and the third roller 230, and the first undried active material layer 5x is continuously formed on the first principal surface 3a of the positive electrode current collector foil 3. This strip-shaped positive electrode plate having the first undried active material layer 5x on the positive electrode current collector foil 3 will be also referred to as an undried one-sided positive electrode plate 1x.

Subsequently, in a "first drying step S18," the first undried active material layer 5x on the positive electrode current collector foil 3 is dried to form the first positive electrode active material layer 5. Specifically, the undried one-sided positive electrode plate 1x is conveyed into a drying device (not shown), where hot air is blown onto the first undried active material layer 5x of the undried one-sided positive electrode plate 1x to evaporate the dispersion medium 14 remaining in the first undried active material layer 5x. Thus, the first positive electrode active material layer 5 is formed. This strip-shaped positive electrode plate having the first positive electrode active material layer 5 on the positive electrode current collector foil 3 will be also referred to as a one-sided positive electrode plate 1y.

Subsequently, in a "second undried layer forming step S19," a "second film forming step S20" and a "second transfer step S21" are performed in the same manner as in the first undried layer forming step S15 described above, to roll out the mixed particle aggregate 25 in the longitudinal direction EH and form a second undried active material layer 6x having a shape of a strip extending in the longitudinal direction EH on the second principal surface 3b of the positive electrode current collector foil 3. Specifically, in the second film forming step S20, the mixed particle aggregate 25 is rolled out by using the roller pressing device 200 described above to form the second undried active material layer 6x as a film on the second roller 220. Then, in the second transfer step S21, the second undried active material layer 6x is transferred from the second roller 220 onto the second principal surface 3b of the positive electrode current collector foil 3 of the one-sided positive electrode plate 1y conveyed by the third roller 230. Thus, a one-side-dried, both-sided positive electrode plate 1z is formed that has the first positive electrode active material layer 5, which has been dried, on the first principal surface 3a of the positive electrode current collector foil 3, and the second undried active material layer 6x, which is yet to be dried, on the second principal surface 3b of the positive electrode current collector foil 3.

Subsequently, in a "second drying step S22," the second undried active material layer 6x on the positive electrode current collector foil 3 is dried in the same manner as in the first drying step S18 described above, to form the second positive electrode active material layer 6. Specifically, the one-side-dried, both-sided positive electrode plate 1z is conveyed into a drying device (not shown), where hot air is blown onto the second undried active material layer 6x of the one-side-dried, both-sided positive electrode plate 1z to form the second positive electrode active material layer 6. Thus, an uncompacted positive electrode plate 1w is formed that has the positive electrode current collector foil 3, the first positive electrode active material layer 5, and the second positive electrode active material layer 6 and that is yet to be compacted.

Subsequently, in a "pressing step S23," the uncompacted positive electrode plate 1w is pressed by rollers using a roller pressing device (not shown) while being conveyed in the longitudinal direction EH, so as to press and compact each of the first positive electrode active material layer 5 and the second positive electrode active material layer 6 in the thickness direction GH. Thus, an uncut positive electrode plate 1v that is yet to be cut is formed.

Figure 4:
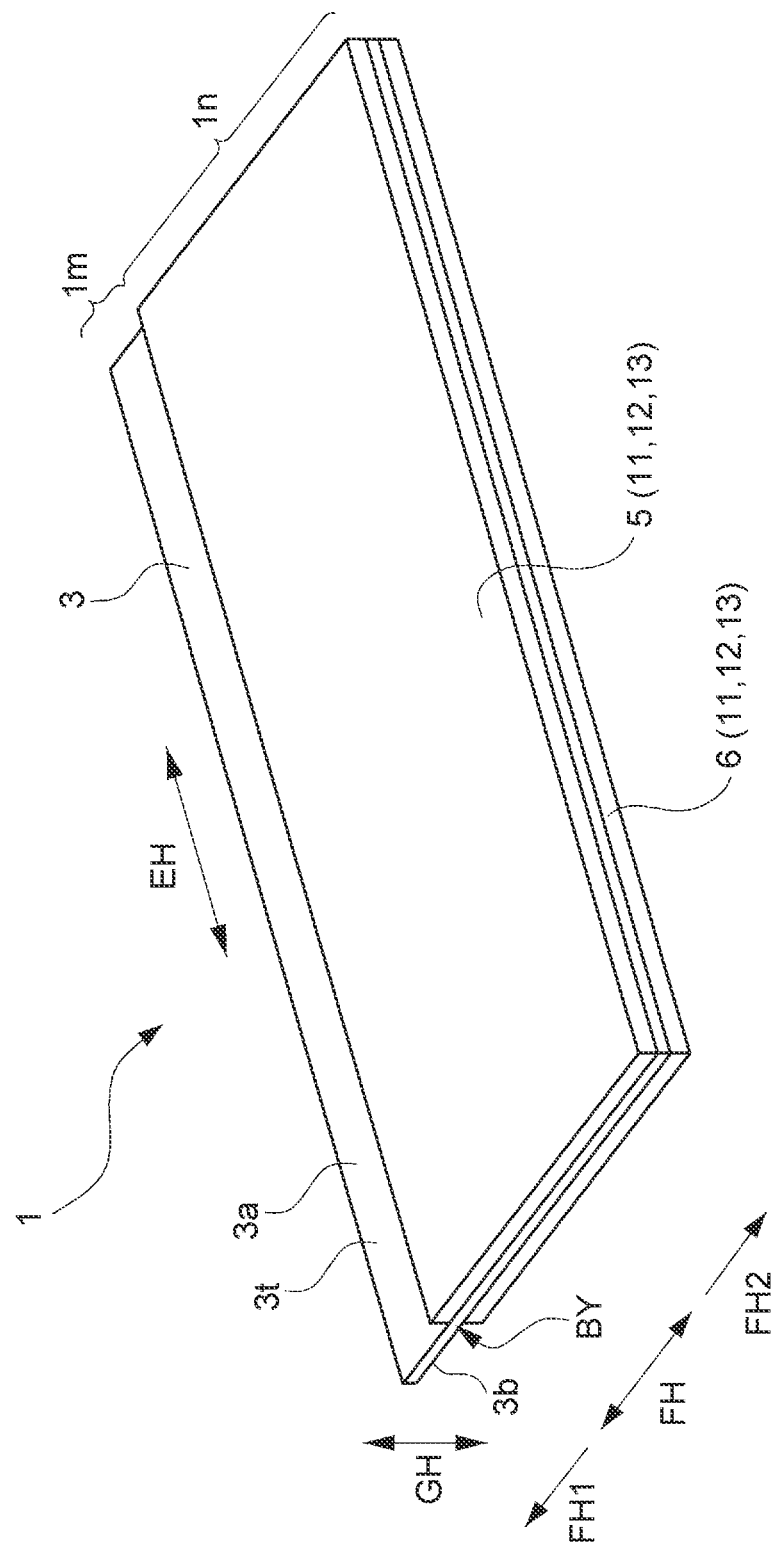
FIG. 4 is a perspective view of a compacted strip-shaped positive electrode plate according to the embodiment.

Subsequently, in a "cutting step S24," the uncut positive electrode plate 1v is cut (into two parts) at a center in the width direction FH, along the longitudinal direction EH. Thus, the compacted strip-shaped positive electrode plate 1 shown in FIG. 4 is obtained.

In a "negative electrode plate manufacturing step S2" (see FIG. 6), the compacted strip-shaped negative electrode plate 131 is separately manufactured. In the manufacturing of the positive electrode plate 1 described above, the mixed particle aggregate 25 composed of the two types of wet particles (the first wet particles 21 and the second wet particles 23) is used. In the manufacturing of the negative electrode plate 131, however, a particle aggregate for the negative electrode composed only of one type of wet particles is prepared. Specifically, by using a stirring mixing-granulating device (not shown) capable of mixing and granulating materials, negative electrode active material particles, a binder, a thickener, and a dispersion medium are mixed together and granulated to obtain a particle aggregate that is an aggregate of wet particles formed by a clay-like mixture of these components.

Next, this particle aggregate is rolled out by a roller pressing device similar to the roller pressing device 200 shown in FIG. 8, to form a first undried active material layer on the first principal surface 133a of the negative electrode current collector foil 133. The first undried active material layer on the negative electrode current collector foil 133 is dried to form the first negative electrode active material layer 135. A second undried active material layer is formed on the second principal surface 133b of the negative electrode current collector foil 133 by using a similar roller pressing device. The second undried active material layer on the negative electrode current collector foil 133 is dried to form the second negative electrode active material layer 136. The first negative electrode active material layer 135, the second negative electrode active material layer 136, and the negative electrode current collector foil 133 are pressed by rollers so as to press and compact each of the first negative electrode active material layer 135 and the second negative electrode active material layer 136 in the thickness direction. Then, this negative electrode plate is cut (into two parts) at a center in the width direction, along the longitudinal direction. Thus, the compacted strip-shaped negative electrode plate 131 is obtained.

Next, in an "electrode body forming step S3" (see FIG. 6), the positive electrode plate 1 and the negative electrode plate 131 are placed one on top of the other, alternately with the pair of separators 141, 143 having been separately prepared, and this electrode-separator assembly is rolled around the axis (see FIG. 3) and compressed into a flat shape (see FIG. 2) to form the flat rolled electrode body 120.

Next, in a "battery assembly step S4," the battery 100 is assembled. Specifically, the case lid member 113 is prepared, and the positive electrode terminal member 150 and the negative electrode terminal member 160 are fixedly installed on the case lid member 113 (see FIG. 1). The positive electrode terminal member 150 and the negative electrode terminal member 160 are welded respectively to the positive electrode plate 1 and the negative electrode plate 131 of the electrode body 120. Then, the electrode body 120 is inserted into the case main body member 111, and the opening of the case main body member 111 is closed with the case lid member 113. The case main body member 111 and the case lid member 113 are welded together to form the battery case 110.

Next, in an "injection and sealing step S5," the electrolyte 105 is injected into the battery case 110 through an injection hole 113h provided in the case lid member 113, and the electrode body 120 is impregnated with the electrolyte 105. Then, the injection hole 113h is sealed with a sealing member 117. Next, in an "inspection step S6," various inspections and initial charging are performed on the battery 100. Thus, the battery 100 is completed.

EXAMPLES AND COMPARATIVE EXAMPLES

Next, a result of a test conducted to verify the effects of the present disclosure will be described. As Example 4, a compacted strip-shaped positive electrode plate 1 was manufactured in the same manner as in the embodiment, by using the same mixed particle aggregate 25 as in the embodiment. Specifically, as shown in Table 1, in Example 4, the mixed particle aggregate 25 was used in which the first wet particles 21 manufactured with the content ratio W1 of the conductive particles 12 to the total solid content set to 2.2 wt % and the second wet particles 23 manufactured with the content ratio W2 of the conductive particles 12 to the total solid content set to 5.8 wt % were mixed together at a weight ratio of 50:50. The difference $\Delta W$ (=W2−W1) between the content ratios W1, W2 is: $\Delta W = 5.8 - 2.2 = 3.6$ wt %. The first positive electrode active material layer 5 and the second positive electrode active material layer 6 were formed in such forms that the first elongated regions 5c, 6c and the second elongated regions 5d, 6d each extended in the longitudinal direction EH of the positive electrode current collector foil 3.

TABLE 1

|  | First wet particles Content ratio W1 of conductive particles (wt %) | Second wet particles Content ratio W2 of conductive particles (wt %) | Extension direction of first and second elongated regions | $\Delta W$ (= W2 − W1) (wt %) | Mixing ratio of first and second wet particles | Evaluation of wrinkles |
|---|---|---|---|---|---|---|
| Example 1 | 3.6 | 4.4 | Longitudinal direction | 0.8 | 50:50 | good |
| Example 2 | 3.2 | 4.8 | Longitudinal direction | 1.6 | 50:50 | good |
| Example 3 | 2.6 | 5.4 | Longitudinal direction | 2.8 | 50:50 | very good |
| Example 4 | 2.2 | 5.8 | Longitudinal direction | 3.6 | 50:50 | very good |
| Example 5 | 2.0 | 6.0 | Longitudinal direction | 4.0 | 50:50 | very good |
| Example 6 | 1.6 | 6.4 | Longitudinal direction | 4.8 | 50:50 | very good |
| Example 7 | 2.2 | 5.0 | Longitudinal direction | 2.8 | 35:65 | very good |
| Example 8 | 2.2 | 6.7 | Longitudinal direction | 4.5 | 60:40 | very good |
| Comparative Example 1 | 4.0 | — | — | — | — | bad |

TABLE 1-continued

| | First wet particles Content ratio W1 of conductive particles (wt %) | Second wet particles Content ratio W2 of conductive particles (wt %) | Extension direction of first and second elongated regions | ΔW (= W2 − W1) (wt %) | Mixing ratio of first and second wet particles | Evaluation of wrinkles |
|---|---|---|---|---|---|---|
| Comparative Example 2 | 3.2 | 4.8 | Width direction | 1.6 | 50:50 | bad |
| Comparative Example 3 | 2.2 | 5.8 | Width direction | 3.6 | 50:50 | bad |
| Comparative Example 4 | 1.6 | 6.4 | Width direction | 4.8 | 50:50 | bad |

Further, as Examples 1 to 3, 5 and 6, mixed particle aggregates 25 were prepared in which the content ratio W1 of the conductive particles 12 to the total solid content of the first wet particles 21 and the content ratio W2 of the conductive particles 12 to the total solid content of the second wet particles 23 were varied from the content ratios W1. W2 in Example 4, and positive electrode plates 1 were manufactured in otherwise the same manner as in Example 4 (as in the embodiment). Specifically, in Example 1, the content ratio W1 was 3.6 wt % and the content ratio W2 was 4.4 wt % (ΔW=0.8 wt %). In Example 2, the content ratio W1 was 3.2 wt % and the content ratio W2 was 4.8 wt % (ΔW=1.6 wt %). In Example 3, the content ratio W1 was 2.6 wt % and the content ratio W2 was 5.4 wt % (ΔW=2.8 wt %). In Example 5, the content ratio W1 was 2.0 wt % and the content ratio W2 was 6.0 wt % (ΔW=4.0 wt %). In Example 6, the content ratio W1 was 1.6 wt % and the content ratio W2 was 6.4 wt % (ΔW=4.8 wt %).

Further, as Examples 7 and 8, positive electrode plates 1 were manufactured by using mixed particle aggregates 25 in which the mixing ratio of the first wet particles 21 and the second wet particles 23 was varied. Specifically, in Example 7, the content ratio W1 was 2.2 wt % and the content ratio W2 was 5.0 wt % (ΔW=2.8 wt %), and the mixing ratio of the first wet particles 21 and the second wet particles 23 was 35:65. In Example 8, the content ratio W1 was 2.2 wt % and the content ratio W2 was 6.7 wt % (ΔW=4.5 wt %), and the mixing ratio of the first wet particles 21 and the second wet particles 23 was 60:40.

On the other hand, as Comparative Example 1, a particle aggregate composed of only one type of wet particles was prepared, and a positive electrode plate was manufactured in otherwise the same manner as in the embodiment. Specifically, a particle aggregate composed of only wet particles manufactured with the content ratio W1 of the conductive particles 12 to the total solid content set to 4.0 wt % was used. In Comparative Example 1, since the particle aggregate is composed of only one type of wet particles, the content ratio of the conductive particles 12 in the first positive electrode active material layer 5 and the second positive electrode active material layer 6 is constant throughout the entire surfaces.

In Comparative Example 2, the same mixed particle aggregate 25 as in Example 2 (the content ratio W1=3.2 wt %; the content ratio W2=4.8 wt %; the mixing ratio 50:50) was prepared. In Comparative Example 3, the same mixed particle aggregate 25 as in Example 4 (the content ratio W1=2.2 wt %; the content ratio W2=5.8 wt %; the mixing ratio 50:50) was prepared. In Comparative Example 4, the same mixed particle aggregate 25 as in Example 6 (the content ratio W1=1.6 wt %; the content ratio W2=6.4 wt %; the mixing ratio 50:50) was prepared. In these Comparative Examples 2 to 4, however, the first wet particles 21 and the second wet particles 23 composing the mixed wet particle aggregate 25 were each rolled out not in the longitudinal direction EH but in the width direction FH. Thus, the first positive electrode active material layer 5 and the second positive electrode active material layer 6 were formed in such a form that the first elongated regions 5c, 6c and the second elongated regions 5d, 6d extended not in the longitudinal direction EH but in the width direction FH.

Next, each of the positive electrode plates 1 of Examples 1 to 8 and Comparative Examples 1 to 4 was examined for wrinkling of the positive electrode current collector foil 3 near the boundary BY between the positive electrode active material section 1n and the positive electrode exposed section 1m. As a result, the positive electrode plates 1 of Examples 3 to 8 had no wrinkles at all in the positive electrode current collector foil 3 near the boundary BY between the positive electrode active material section 1n and the positive electrode exposed section 1m (see the double circles, meaning "very good," in "Evaluation of wrinkles" of Table 1). The positive electrode plates 1 of Examples 1 and 2 had only small wrinkles (with the depth of each wrinkle smaller than 30 μm) in the positive electrode current collector foil 3 near the boundary BY between the positive electrode active material section 1n and the positive electrode exposed section 1m (see the circles, meaning "good," in "Evaluation of wrinkles" of Table 1). By contrast, the positive electrode plates 1 of Comparative Examples 1 to 4 had large wrinkles (with the depth of each wrinkle equal to or larger than 30 μm) in the positive electrode current collector foil 3 near the boundary BY between the positive electrode active material section 1n and the positive electrode exposed section 1m (see the crosses, meaning "bad," in "Evaluation of wrinkles" of Table 1).

A possible explanation for this result is as follows: First, in Comparative Example 1, a large pressure (linear pressure) is applied to the thick positive electrode active material section 1n when the positive electrode plate 1 is pressed by rollers in the pressing step S23, so that in the positive electrode active material section 1n, the first positive electrode active material layer 5, the second positive electrode active material layer 6, and the positive electrode current collector foil 3 are compressed, and the positive electrode current collector foil 3 is stretched in both the longitudinal direction EH and the width direction FH. On the other hand, little pressure is applied to the thin positive electrode exposed section 1m, so that the positive electrode current collector foil 3 in the positive electrode exposed section 1m is hardly stretched in either the longitudinal direction EH or the width direction FH. Thus, the positive electrode current collector foil 3 in the positive electrode active material section 1n is stretched in the longitudinal direction EH, whereas the positive electrode current collector foil 3 in the positive electrode exposed section 1*m* is hardly stretched in the longitudinal direction EH. This difference seems to have caused the large wrinkles in the positive electrode current collector foil 3 near the boundary BY between the positive electrode active material section 1*n* and the positive electrode exposed section 1*m*.

Also in Comparative Examples 2 to 4, of the first positive electrode active material layer 5 and the second positive electrode active material layer 6 of the positive electrode plate 1 before the pressing step S23, the first elongated regions 5*c*, 6*c* are relatively hard due to the low content ratio (W1) of the conductive particles 12, while the second elongated regions 5*d*, 6*d* are relatively soft due to the high content ratio (W2) of the conductive particles 12. In Comparative Examples 2 to 4, however, the first elongated regions 5*c*, 6*c* and the second elongated regions 5*d*, 6*d* of the first positive electrode active material layer 5 and the second positive electrode active material layer 6 are each long in the width direction FH and short in the longitudinal direction EH.

When a linear pressure along the width direction FH is applied by roller pressing in the pressing step S23 to the hard first elongated regions 5*c*, 6*c* of the positive electrode active material section 1*n* that extend in the width direction FH, portions of the positive electrode current collector foil 3 that are located directly below the first elongated regions 5*c*, 6*c* are easily stretched in the longitudinal direction EH because of the presence of the soft second elongated regions 5*d*, 6*d* on front and rear sides of the hard first elongated regions 5*c*, 6*c* in the longitudinal direction EH, but are hardly stretched in the width direction FH in which the hard first elongated regions 5*c*, 6*c* continue. Accordingly, in the positive electrode active material section 1*n* as a whole, the positive electrode current collector foil 3 is stretched by roller pressing to a small extent in the width direction FH but to a large extent in the longitudinal direction EH. Thus, the positive electrode current collector foil 3 in the positive electrode active material section 1*n* is stretched in the longitudinal direction EH, whereas the positive electrode current collector foil 3 in the positive electrode exposed section 1*m* is hardly stretched in the longitudinal direction EH. This difference seems to have caused the large wrinkles in the positive electrode current collector foil 3 near the boundary BY between the positive electrode active material section 1*n* and the positive electrode exposed section 1*m*.

In Examples 1 to 8, by contrast, the first elongated regions 5*c*, 6*c* and the second elongated regions 5*d*, 6*d* of the first positive electrode active material layer 5 and the second positive electrode active material layer 6 are each long in the longitudinal direction EH and short in the width direction FH. When a linear pressure along the width direction FH is applied to the positive electrode active material section 1*n* by roller pressing in the pressing step S23, most of the load is placed on the first elongated regions 5*c*, 6*c* that are relatively hard and present as dots in the width direction FH. On the other hand, the soft second elongated regions 5*d*, 6*d* are present on both sides of the hard first elongated regions 5*c*, 6*c* in the width direction FH.

Therefore, portions of the positive electrode current collector foil 3 that are located directly below the first elongated regions 5*c*, 6*c* are easily stretched in the width direction FH but hardly stretched in the longitudinal direction EH in which the hard first elongated regions 5*c*, 6*c* continue. Accordingly, in the positive electrode active material section 1*n* as a whole, the positive electrode current collector foil 3 is stretched by roller pressing to a large extent in the width direction FH but to a small extent in the longitudinal direction EH, compared with the positive electrode current collector foil 3 in the positive electrode active material section 1*n* of Comparative Example 1 in which the hardness of the first positive electrode active material layer 5 and the second positive electrode active material layer 6 is constant throughout the entire surfaces. This seems to be why less wrinkles occurred in the positive electrode current collector foil 3 near the boundary BY between the positive electrode active material section 1*n* and the positive electrode exposed section 1*m* as a result of roller pressing.

The positive electrode plates 1 of Examples 3 to 8 had even less wrinkles than the positive electrode plates 1 of Examples 1 and 2, presumably because the difference ΔW between the content ratio W2 of the conductive particles 12 in the second wet particles 23 and the content ratio W1 of the conductive particles 12 in the first wet particles 21 is especially large, with the difference ΔW being equal to or higher than 2.8 wt %. Specifically, when the difference ΔW between the content ratios W1, W2 is set to equal to or higher than 2.8 wt %, an especially great difference in hardness is created between the first elongated regions 5*c*, 6*c* and the second elongated regions 5*d*, 6*d* in the first positive electrode active material layer 5 and the second positive electrode active material layer 6 before the pressing step S23. Accordingly, the restraining effect on stretching in the longitudinal direction EH of the positive electrode current collector foil 3 in the positive electrode active material section 1*n* in the pressing step S23 is especially great. This seems to be why wrinkling of the positive electrode current collector foil 3 near the boundary BY between the positive electrode active material section 1*n* and the positive electrode exposed section 1*m* could be reduced especially effectively.

As has been described above, in the manufacturing method of the compacted strip-shaped positive electrode plate 1, the particle aggregate used in the undried layer forming step (the first undried layer forming step S15 and the second undried layer forming step S19) is a mixed particle aggregate 25 in which the first wet particles 21 manufactured with the content ratio W1 of the conductive particles 12 to the total solid content set to W1 (wt %) and the second wet particles 23 manufactured with the content ratio of the conductive particles 12 to the total solid content set to W2 (wt %), W2 being higher than W1 (W2>W1), are mixed together. Thus, the first undried active material layer 5*x* and the second undried active material layer 6*x* formed by rolling in the first undried layer forming step S15 and the second undried layer forming step S19, and the first positive electrode active material layer 5 and the second positive electrode active material layer 6 obtained by drying these undried active material layers 5*x*, 6*x* in the first drying step S18 and the second drying step S22, have a form in which the two types of elongated regions (the first elongated regions 5*c*, 6*c* and the second elongated regions 5*d*, 6*d*) that derive respectively from the first wet particles 21 and the second wet particles 23 and are each elongated in the longitudinal direction EH are randomly (irregularly) distributed.

As described above, the first elongated regions 5*c*, 6*c* with the content ratio W1 of the conductive particles 12 that is a low content ratio are relatively hard, while the second elongated regions 5*d*, 6*d* with the content ratio W2 (W2>W1) of the conductive particles 12 that is a high content ratio are relatively soft. When the first positive electrode active material layer 5 and the second positive electrode active material layer 6 in which the first elongated regions 5c, 6c and the second elongated regions 5d, 6d thus different in hardness from each other are randomly distributed are pressed by rollers while being conveyed in the longitudinal direction EH in the pressing step S23, less wrinkling occurs near the boundary BY between the positive electrode active material section 1n and the positive electrode exposed section 1m.

Since AB particles are used as the conductive particles 12 in the manufacturing method of the positive electrode plate 1, good conductivity of the first positive electrode active material layer 5 and the second positive electrode active material layer 6 can be secured. In addition, it is easy to form the first wet particles 21 and the second wet particles 23, different from each other in hardness after drying, in the first wet particle forming step S12 and the second wet particle forming step S13, by setting the content ratios W1, W2 (wt %) of the conductive particles (AB particles) 12 in the first wet particles 21 and the second wet particles 23 to different ratios.

In the manufacturing method of the positive electrode plate 1, the difference ΔW between the content ratio W2 of the conductive particles 12 in the second wet particles 23 and the content ratio W1 of the conductive particles 12 in the first wet particles 21 is set to 0.8 wt % or higher, and further set to 2.8% or higher, thus creating a sufficiently great difference in hardness between the first elongated regions 5c, 6c and the second elongated regions 5d, 6d of the first positive electrode active material layer 5 and the second positive electrode active material layer 6 before the pressing step S23. Accordingly, the restraining effect on stretching in the longitudinal direction EH of the positive electrode current collector foil 3 in the positive electrode active material section 1n during roller pressing is sufficiently great, so that wrinkling of the positive electrode current collector foil 3 near the boundary BY between the positive electrode active material section 1n and the positive electrode exposed section 1m can be reduced more effectively.

In the manufacturing method of the positive electrode plate 1, the first wet particles 21 and the second wet particles 23 are mixed together in roughly equal amounts (at a weight ratio of 65:35 to 35:65) in the mixed particle aggregate 25. Accordingly, the first elongated regions 5c, 6c and the second elongated regions 5d, 6d are randomly distributed in roughly equal amounts (at an area ratio of 65:35 to 35:65) in the first positive electrode active material layer 5 and the second positive electrode active material layer 6 formed in the first drying step S18 and the second drying step S22. When such first positive electrode active material layer 5 and second positive electrode active material layer 6 are pressed by rollers, wrinkling of the positive electrode current collector foil 3 near the boundary BY between the positive electrode active material section 1n and the positive electrode exposed section 1m can be reduced more favorably.

In the manufacturing method of the positive electrode plate 1, the wet particles (the first wet particles 21 and the second wet particles 23) are each rolled out in the longitudinal direction EH in the first film forming step S16 of the first undried layer forming step S15 and the second film forming step S20 of the second undried layer forming step S19, and the first undried active material layer 5x and the second undried active material layer 6x are transferred onto the positive electrode current collector foil 3 in the first transfer step S17 and the second transfer step S21. Thus, it is easy to form the first undried active material layer 5x and the second undried active material layer 6x, and further the first positive electrode active material layer 5 and the second positive electrode active material layer 6, in which the first elongated regions 5c, 6c formed by the first wet particles 21 and elongated in the longitudinal direction EH and the second elongated regions 5d, 6d formed by the second wet particles 23 and elongated in the longitudinal direction EH are randomly distributed.

While the present disclosure has been described above based on the embodiment, it should be understood that the present disclosure is not limited to the above-described embodiment but can be applied with changes appropriately made thereto within the scope of the gist of the disclosure. For example, the present disclosure is applied to the manufacturing of the compacted strip-shaped positive electrode plate 1 in the embodiment, but the disclosure is also applicable to the manufacturing of the compacted strip-shaped negative electrode plate 131.

As the electrode body 120 of the battery 100 of the embodiment, the flat rolled electrode body 120 formed by using the compacted strip-shaped positive electrode plate 1 as is in the strip shape has been illustrated. However, the electrode body 120 is not limited to this example. For example, the electrode body of the battery 100 may also be a stacked electrode body that is formed by cutting the compacted strip-shaped positive electrode plate 1 at predetermined intervals in the longitudinal direction EH so as to form rectangular positive electrode plates, preparing pluralities of rectangular negative electrode plates and separators, and then stacking the rectangular positive electrode plates and the rectangular negative electrode plates alternately with the separators.

What is claimed is:

1. A manufacturing method of a compacted strip-shaped electrode plate,
the compacted strip-shaped electrode plate including:
a strip-shaped current collector foil; and
an active material layer that is formed on the current collector foil in a shape of a strip extending in a longitudinal direction of the current collector foil, contains active material particles and conductive particles, and is compacted by being pressed in a thickness direction of the current collector foil,
the compacted strip-shaped electrode plate having:
an active material section which has a shape of a strip extending in the longitudinal direction and in which the active material layer is provided in the thickness direction; and
an exposed section which is located at an end portion, in a width direction, of the current collector foil and has a shape of a strip extending in the longitudinal direction, and in which the current collector foil is exposed without the active material layer being provided in the thickness direction,
the active material layer having, in a random distribution:
a plurality of first elongated regions which is elongated in the longitudinal direction and in which a content ratio of the conductive particles is W1 wt %; and
a plurality of second elongated regions which is elongated in the longitudinal direction and in which a content ratio of the conductive particle is W2 wt %, W2 being higher than W1,
the manufacturing method comprising:
an undried layer forming step of forming, on the current collector foil, an undried active material layer having a shape of a strip extending in the longitudinal direction by rolling out, in the longitudinal direction, a particle aggregate that is an aggregate of wet particles including the active material particles, the conductive particles, and a dispersion medium;

a drying step of drying the undried active material layer on the current collector foil to form the active material layer; and a pressing step of pressing the active material layer and the current collector foil by rollers so as to compact the active material layer while conveying the active material layer and the current collector foil in the longitudinal direction, wherein the particle aggregate is a mixed particle aggregate in which are mixed together:

first wet particles manufactured with a content ratio of the conductive particles to a total solid content set to W1 wt %; and second wet particles manufactured with a content ratio of the conductive particles to a total solid content set to W2 wt %, and wherein the first wet particles and the second wet particles are each comprised of the active material particles, the conductive particles, binder and a dispersion medium, with the second wet particles containing a higher content of the conductive particles than the first wet particles.

2. The manufacturing method of a compacted strip-shaped electrode plate according to claim 1, wherein the conductive particles are acetylene black particles.

3. The manufacturing method of a compacted strip-shaped electrode plate according to claim 1, wherein a difference ΔW between the content ratio W2 of the conductive particles in the second wet particles and the content ratio W1 of the conductive particles in the first wet particles satisfies a following condition: ΔW≥0.8 wt %.

4. The manufacturing method of a compacted strip-shaped electrode plate according to claim 1, wherein the mixed particle aggregate has the first wet particles and the second wet particles mixed together at a weight ratio of 65:35 to 35:65.

5. The manufacturing method of a compacted strip-shaped electrode plate according to claim 1, wherein the undried layer forming step has:

a film forming step of rolling out the mixed particle aggregate by passing the mixed particle aggregate through a first roller gap between a first roller and a second roller disposed parallel to the first roller, so as to form the undried active material layer as a film on the second roller; and a transfer step of transferring the undried active material layer from the second roller onto the current collector foil that has been passed through a second roller gap between the second roller and a third roller disposed parallel to the second roller.

6. A compacted strip-shaped electrode plate comprising:
a strip-shaped current collector foil; and
an active material layer that is formed on the current collector foil in a shape of a strip extending in a longitudinal direction of the current collector foil, contains active material particles and conductive particles, and is compacted by being pressed in a thickness direction of the current collector foil, wherein the compacted strip-shaped electrode plate has:
an active material section which has a shape of a strip extending in the longitudinal direction and in which the active material layer is provided in the thickness direction; and an exposed section which is located at an end portion, in a width direction, of the current collector foil and has a shape of a strip extending in the longitudinal direction, and in which the current collector foil is exposed without the active material layer being provided in the thickness direction, wherein the active material layer has, in a random distribution:
a plurality of first elongated regions which is elongated in the longitudinal direction and in which a content ratio of the conductive particles is W1 wt %; and a plurality of second elongated regions which is elongated in the longitudinal direction and in which a content ratio of the conductive particles is W2 wt %, W2 being higher than W1, and wherein the active material layer has the first elongated regions and the second elongated regions randomly distributed at an area ratio of 65:35 to 35:65.

7. The compacted strip-shaped electrode plate according to claim 6, wherein the conductive particles are acetylene black particles.

8. The compacted strip-shaped electrode plate according to claim 6, wherein a difference ΔW between the content ratio W2 of the conductive particles in the second elongated regions and the content ratio W1 of the conductive particles in the first elongated regions satisfies a following condition: ΔW≥0.8 wt %.

9. A battery comprising an electrode body that employs the compacted strip-shaped electrode plate according to claim 6.

* * * * *